(12) United States Patent
Small

(10) Patent No.: US 6,232,675 B1
(45) Date of Patent: May 15, 2001

(54) POWER DISTRIBUTION APPARATUS COMPRISING RELAY DEVICES FOR CONTROLLING CURRENT FLOW ALONG POWER PATHS OF THE POWER DISTRIBUTION APPARATUS

(75) Inventor: Kenneth T Small, Cupertino, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/191,761

(22) Filed: Nov. 14, 1998

(51) Int. Cl.[7] .................................................. H02H 1/04
(52) U.S. Cl. ............................................... 307/30; 307/38
(58) Field of Search ................................ 307/30, 36, 38, 307/52, 114, 140; 315/361; 361/56, 91, 93, 111, 119

(56) References Cited

U.S. PATENT DOCUMENTS 4,755,691 * 7/1988 Bethea .................................. 307/114
5,579,201 * 11/1996 Karageozian ........................ 361/119

* cited by examiner

Primary Examiner—Fritz Fleming

(57) ABSTRACT

A power distribution apparatus which utilizes relay devices to control the flow of power along power paths from an input terminal to one or more output terminals electrically coupled to the power paths. For each power path provided in the power distribution apparatus, the power distribution apparatus comprises one relay device and one or more output terminals associated with each power path. In operation, the relay device associated with each power path controls the flow of current from the input terminal to the output terminals electrically coupled to the power path. A switching assembly is electrically coupled to the power distribution apparatus for controlling the relay devices. When the switching assembly is activated, the relay devices are switched on and current is allowed to flow from the input terminal to the output terminals. When the switching assembly is deactivated, the relay devices are switched off and current is prevented from flowing from the input terminal to the output terminals. Preferably, the power distribution apparatus comprises a controller which controls the operation of the power distribution apparatus. When the switching assembly is activated and deactivated, the controller causes the relay devices to be closed and opened, respectively. Preferably, the controller switches the relay devices on and off in accordance with a predetermined timing sequence such that a time delay occurs from the time that one relay device is turned on or off before another relay device is switched on or off in the power distribution apparatus.

18 Claims, 8 Drawing Sheets

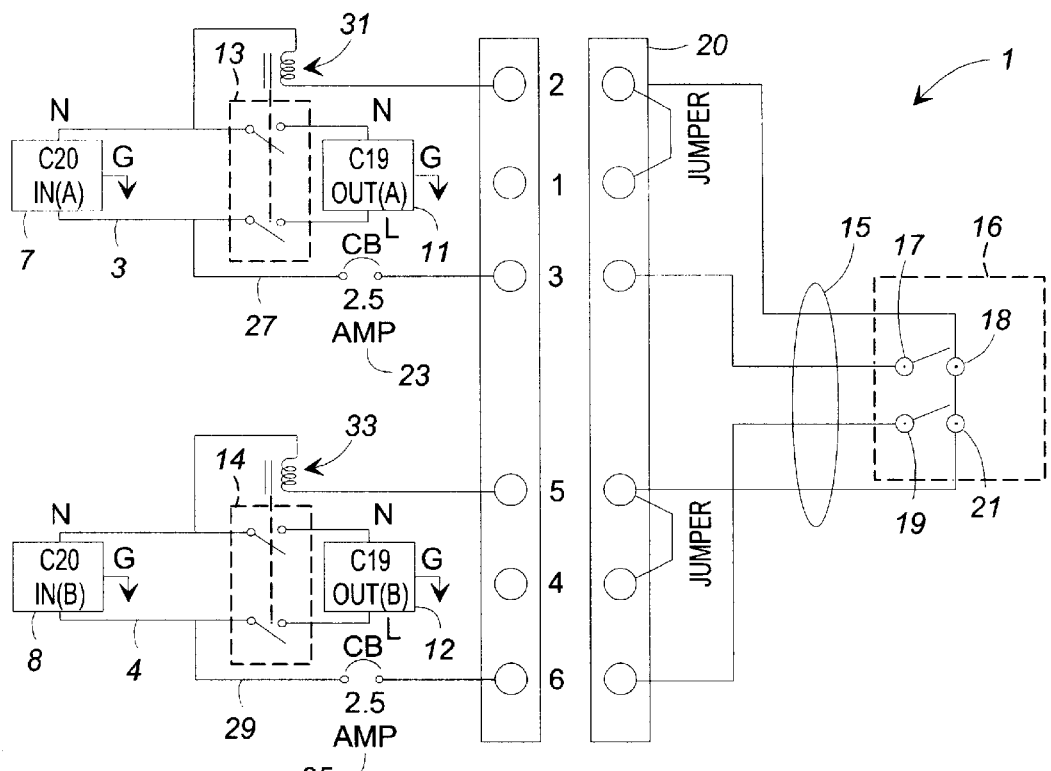
FIG. 1
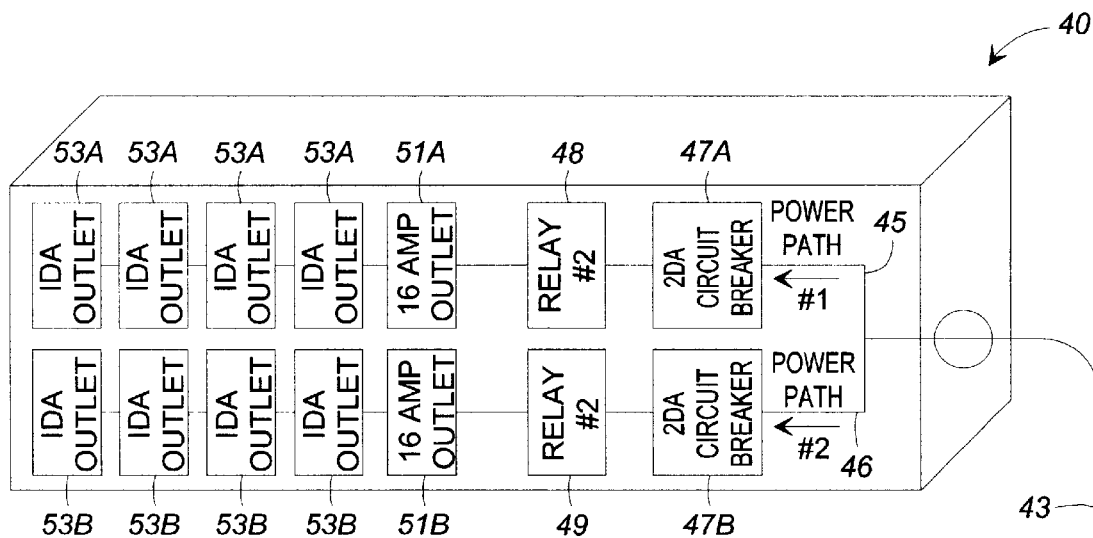
FIG. 2A
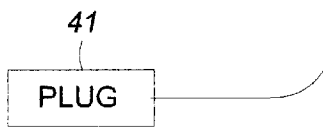

POWER DISTRIBUTION APPARATUS COMPRISING RELAY DEVICES FOR CONTROLLING CURRENT FLOW ALONG POWER PATHS OF THE POWER DISTRIBUTION APPARATUS

TECHNICAL FIELD OF THE INVENTION

The present invention generally relates to a power distribution apparatus and, more particularly, to a power distribution apparatus having multiple relay devices for controlling the flow of current along multiple power paths within the power distribution apparatus from an input terminal connected to a power source to output terminals along the power paths.

BACKGROUND OF THE INVENTION

Power distribution units typically comprise an input terminal for connecting a power source to the power distribution unit and one or more output terminals for connecting electrical components to be powered by the power source to the power distribution unit. The output terminals may have the same or different output current ratings. Typically, power distribution units have multiple power paths and contain electrical circuitry which reduces the amount of current being provided to certain output terminals to cause certain output terminals to have different current ratings than others. This allows different electrical components which have different power requirements to be powered from a single power distribution unit by connecting the electrical components to the appropriate output terminals.

Power distribution units currently available on the market do not implement relay devices for controlling the flow of current along power paths within the power distribution unit. Therefore, with typical power distribution units, current being provided to an output terminal cannot be turned off by activating a relay device on the power distribution unit. Rather, power being provided to an electrical component connected to an output terminal of the power distribution unit must be turned off by actuating a mechanism, such as an on/off switch, comprised by the electrical component, or by disconnecting the power supply from the power distribution unit.

It would be advantageous to provide a power distribution unit which would allow power being supplied to electrical components connected to the output terminals of the power distribution unit to be turned on and off from the power distribution unit. This would eliminate the need for separately turning on and off electrical components connected to the output terminals of the power distribution unit. However, simultaneously turning on several electrical components connected to output terminals along a single power path of the power distribution unit may result in an input current surge, which could damage the electrical components. Similarly, simultaneously turning off several electrical components connected to output terminals along a single power path of the power distribution unit may result in large voltage transients on the power source, which could damage the power source or damage electrical component loads that are being disconnected from the power source.

Accordingly, a need exists for a power distribution apparatus which comprises a plurality of output terminals disposed along one or more power paths of the power distribution apparatus and which comprises relay devices which control the flow of current along the power paths. A need also exists for a power distribution apparatus which can perform these functions without generating input current surges when power is provided to multiple electrical component loads connected to the output terminals of a power path and without generating large current and voltage transients when power being provided to multiple electrical component loads connected to the output terminals of a power path is removed.

SUMMARY OF THE INVENTION

The present invention is a power distribution apparatus which utilizes relay devices to control the flow of power along power paths from an input terminal to one or more output terminals electrically coupled to the power paths. The present invention is not limited with respect to the number of power paths, relay devices, or output terminals comprised by the power distribution apparatus. Preferably, the power distribution apparatus comprises at least two isolated power paths, at least one output terminal electrically coupled to each power path, one relay device associated with each power path and one input terminal for receiving power from an external power source.

In operation, the relay device associated with each power path controls the flow of current from the input terminal to the output terminals electrically coupled to the power path. Preferably, a switching assembly is electrically coupled to the power distribution apparatus for controlling the relay devices. When the switching assembly is activated, the relay devices are switched on and current is allowed to flow from the input terminal to the output terminals. When the switching assembly is deactivated, the relay devices are switched off and current is prevented from flowing from the input terminal to the output terminals.

In accordance with the preferred embodiment of the present invention, the power distribution apparatus comprises a controller which controls the operation of the power distribution apparatus. The switching assembly is coupled to the controller such that the controller senses when the switching assembly has been activated and deactivated. The controller is also coupled to the input terminal. When the switching assembly is activated, the controller causes the relay devices to be closed so that current is provided to the output terminals. When the switching assembly is deactivated, the controller causes the relay devices to be opened so that current is prevented from flowing to the output terminals.

When multiple relay devices are implemented in the power distribution apparatus, preferably the controller switches the relay devices on and off in accordance with a predetermined timing sequence such that a time delay occurs from the time that one relay device is turned on or off before another relay device is switched on or off in the power distribution apparatus. By switching the relay devices on in accordance with this timing sequence, current surges on the power distribution apparatus are prevented. By switching the relay devices off in accordance with this timing sequence, voltage transients in the input power source are prevented from occurring.

Other features and advantages of the present invention will become apparent from the following description, drawings and claims.

BRIEF DESCRIPTION OF THE DRAWINGS

FIG. 1 is a block diagram of a first embodiment of the power distribution apparatus of the present invention wherein the power distribution apparatus comprises two isolated power paths and a relay switch associated with each power path for controlling power to the output terminals associated with the power paths.

FIG. 2A is a front perspective view of the power distribution apparatus of the present invention in accordance with a second embodiment wherein the power distribution apparatus comprises two isolated power paths, five output terminals associated with each power path, and a relay device associated with each power path.

DETAILED DESCRIPTION OF THE INVENTION

Figure 2B:
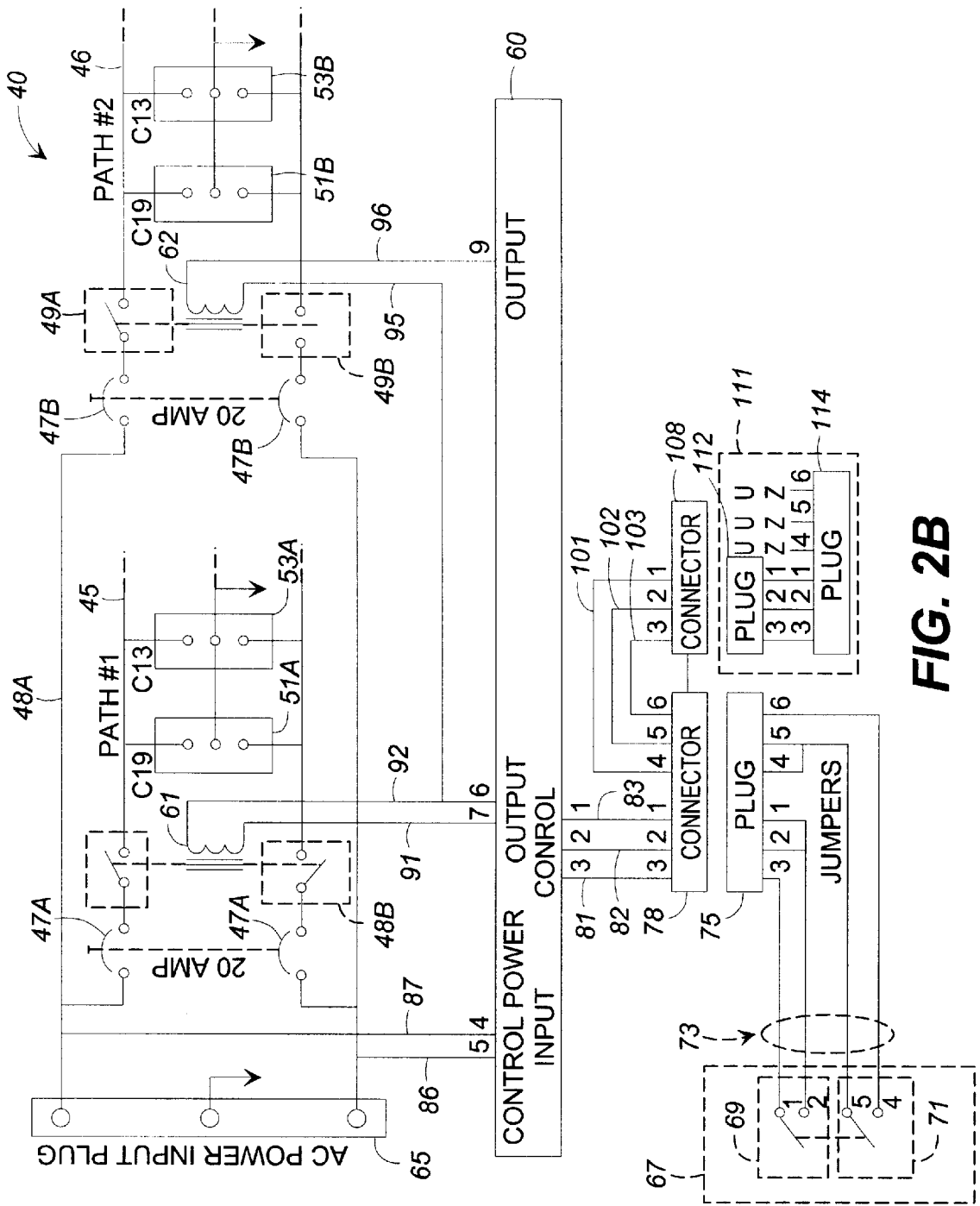
FIG. 2B is a schematic block diagram of the power distribution apparatus shown in FIG. 2A.

FIG. 1 is a schematic block diagram of a power distribution apparatus 1 in accordance with a first embodiment of the present invention. The power distribution apparatus 1 shown in FIG. 1 provides two isolated power paths 3 and 4. The input terminals IN(A) 7 and IN(B) 8 are connected to respective power sources (not shown) which provide power to the output terminals 11 and 12 when the relays 13 and 14 for the power paths 3 and 4, respectively, are closed.

A four-conductor cable 15 connects an on/off switch assembly 16, which controls the switching of the relays 13 and 14, to a connector 20 of the power distribution apparatus 1. Specifically, the on/off switch assembly 16 comprises two on/off switches. One of the on/off switches, which is comprised of poles 17 and 18, controls the operation of relay 13. The other on/off switch, which is comprised of poles 19 and 21, controls the operation of relay 14. When the on/off switch comprised of poles 17 and 18 is in the closed position, current flows from the power source through the circuit consisting of input terminal 7, inductor 31, connector 20, on/off switch assembly 16, and circuit breaker 23. When current flows through the inductor 31, the magnetic flux generated by the inductor 31 causes the relay 13 to be automatically switched to the closed position. When the relay 13 is in the closed position, power flows from the power source connected to input terminal 7 to the output terminal 11. The relays 13 and 14 preferably are two-pole electromechanical switches having coils (not shown) which have current induced in them via inductors 31 and 33, respectively.

Similarly, when the on/off switch comprised of poles 19 and 21 is in the closed position, current flows from the power source through the circuit consisting of input terminal 8, inductor 33, connector 20, on/off switch assembly 16, and circuit breaker 25. When current flows through the inductor 33, the magnetic flux generated by the inductor 33 causes the relay 14 to be automatically switched to the closed position. When the relay 14 is in the closed position, power flows from the power source connected to input terminal 8 to the output terminal 12.

Preferably, the power distribution apparatus 1 shown in FIG. 1 provides two isolated 16-ampere (amp) power paths 3 and 4. However, it will be understood by those skilled in the art that the power distribution apparatus shown in FIG. 1 is not limited to any particular current rating. Each of the input terminals 7 and 8 has a fuse, or circuit breaker, 23 and 25, respectively, electrically coupled thereto which provides the connections from the on/off switch assembly 16 to the input terminals 7 and 8. This fuse preferably is a 2.5 amp fuse which protects the on/off switch assembly 16. Preferably, these fuses are equipped with buttons which allow the fuses to be reset by depressing the buttons. Those skilled in the art will understand that the circuit breaker is not a critical component of the power distribution apparatus 1 of the present invention. It should be noted that, since there is no electrical connection between the power paths, the power paths may be connected to different power sources or alternating current (AC) phases.

FIG. 2A illustrates a perspective view of the power distribution apparatus of the present invention in accordance with a second embodiment wherein a single power source (not shown) connected to plug 41 provides power to the power distribution apparatus 40 via cable 43. The power distribution apparatus 40 comprises two power paths 45 and 46. Power path 45 includes a circuit breaker 47A, a relay device 48, one output terminal 51A of a first current rating, and four output terminals 53A of a second current rating. Identically, power path 46 includes a circuit breaker 47B, a relay device 49, one output terminal 51B of a first current rating, and four output terminals 53B of a second current rating. An on/off switch assembly (not shown) controls the switching of relay devices 48 and 49 in paths 45 and 46, respectively, to control power to the output terminals 51A/51B and 53A/53B.

Preferably, for implementations in North America, the power distribution apparatus 40 shown in FIG. 2A is a 30 amp, single phase, power distribution apparatus and provides 20 amps of current to output terminals 51 and 15 amps of current to output terminals 53. The circuit breakers 47 preferably are 20 amp, 2-pole circuit breakers. For international implementations of the power distribution apparatus 40, the input current rating will be 32 amps rather than 30 amps and the output currents provided to output terminal 51A/51B will be 16 amps and the output current provided to terminals 53A/53B will be 10 amps. Therefore, the power distribution apparatus 40 meets the UL 1950/CSA 950 North American regulatory requirements and the EN 60950/IEC 950 International regulatory requirements. However, it will be understood by those skilled in the art that the power distribution apparatus 40 shown in FIG. 2A is not limited to any particular input and output current ratings.

FIG. 2B is a schematic block diagram of the power distribution apparatus 40 shown in FIG. 2A. The power distribution apparatus 40 comprises a controller 60, which preferably is a printed circuit board, for controlling the relay devices 48 and 49. The relay device 48 shown in FIG. 2A is designated by the dashed boxes 48A and 48B shown in FIG.

2B and the relay device 49 shown in FIG. 2A is designated by the dashed boxes 49A and 49B shown in FIG. 2B. The controller 60 controls the current provided to the inductors 61 and 62 for opening and closing the relays 48A/48B and 49A/49B, respectively. The controller 60 will be discussed in more detail below with respect to FIGS. 5A and 5B.

When the relays 48A/48B and 49A/49B are closed, power is provided from the external power source (not shown) connected to the AC power input terminal 65 to the output terminals 51A/51B and 53A/53B connected to power paths 45 and 46. For ease of illustration, only four of the ten output terminals 51A/51B and 53A/53B shown in FIG. 2A are illustrated in FIG. 2B. An on/off switch assembly 67 is electrically coupled to the controller 60 to allow the switching of the relays 48A/48B and 49A/49B to be controlled from the on/off switch assembly 67. The on/off switch assembly 67 comprises two on/off switches 69 and 71 which control the operation of relays 48A/48B and 49A/49B, respectively, via the controller 60.

The on/off switch assembly 67 may be mounted on the power distribution apparatus 40 directly and connected directly to the controller 60. Alternatively, the on/off switch assembly 67 may be remotely connected to the controller 60 via a cable to allow the operation of the relays 48A/48B and 49A/49B to be controlled remotely. This latter arrangement is shown in FIG. 2B. FIG. 2B, which illustrates the on/off switch assembly 67 being coupled to a cable 73, which is connected to a plug 75, which, in turn, is coupled with a connector 78. The connector 78 is mounted on the power distribution apparatus 40 and provides the electrical connection between the on/off switch assembly 67 and the controller 60.

When on/off switch 69 is activated, the controller 60 senses the activation through the lines 81, 82 and 83 which couple the connector 78 to the controller 60. The controller 60 receives the power input from the AC power input plug 65 via lines 86 and 87. The controller 60 then causes a current to be passed through inductor 61 via lines 91 and 92. The current passing through the inductor 61 generates a magnetic flux which causes the relay device 48A/48B to close, thereby allowing current to pass from the AC power input plug 65 to the output terminals 51A and 53A along power path 45.

Similarly, when on/off switch 71 is closed, the controller 60 senses this event via lines 81, 82 and 83 and causes a current to be passed through inductor 62 via lines 95 and 96. The current passing through inductor 62 generates a magnetic flux which, in turn, causes the relay device 49A/49B to close, thereby allowing current to flow from AC power input plug 65 to output terminals 51B and 53B along power path 46. The circuit breakers 47A and 47B preferably are 20-amp, two-pole circuit breakers which prevent over voltages emanating from the power source from affecting the electrical components (not shown) connected to the output terminals 51A/51B and 53A/53B.

It should be noted that the circuit breakers 47A and 47B may be separate, independent circuit breakers, as shown in FIG. 2B, or they may be combined into a single four-pole unit (not shown). Preferably, the circuit breakers are separate, independent circuit breakers so that one power path may continue operation even when the circuit breaker in the other path has cut off the flow of current to the output terminals along that path.

In accordance with the preferred embodiment of the present invention, the connector 78 is connected by lines 101, 102 and 103 to a second connector 108 which is also comprised by the power distribution apparatus 40. This connector 108 can be used to enable an additional power distribution apparatus identical to power distribution apparatus 40 to be connected together or, in other words, daisy chained. A second power distribution apparatus (not shown) may be connected to power distribution apparatus 40 via plug assembly 111. Plug assembly 111 comprises a cable (not shown) having a plug 112 on one end thereof, which is plugged into connector 108, and having a plug 114 on the other end thereof, which is plugged into the connector 78 on the second power distribution apparatus (not shown). This feature of the present invention allows the second power distribution apparatus to be controlled by the on/off switch assembly 67 in the manner discussed above for controlling the operations of relays 48A/48B and 49A/49B of the power distribution apparatus 40 shown in FIG. 2B. However, it will be understood by those skilled in the art that the connector 108 is not critical to the present invention and that it is not necessary to the operations of the power distribution apparatus 40.

Figure 3A:
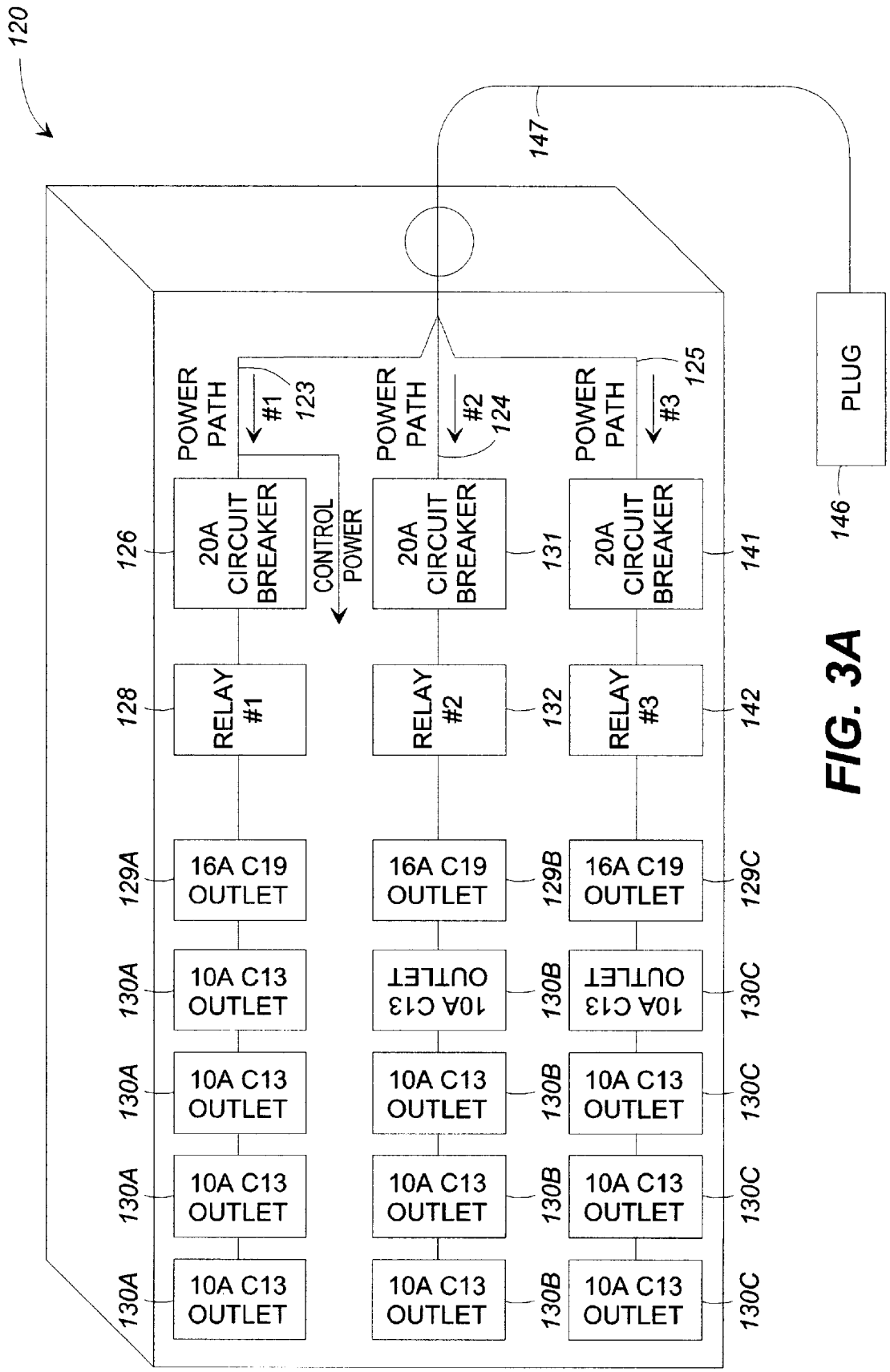
FIG. 3A is a perspective view of the power distribution apparatus of the present invention in accordance with a third embodiment wherein the power distribution apparatus comprises three isolated power paths, five output terminals associated with each power path, and a relay device associated with each power path.

FIG. 3A is a perspective view of the power distribution apparatus of the present invention in accordance with a third embodiment of the present invention. In accordance with this embodiment of the present invention, the power distribution apparatus 120 is a single-phase power distribution apparatus and comprises three power paths 123, 124 and 125. The power distribution apparatus 120 is connected to an AC power supply (not shown) via a plug 146 and cable 147. The first power path 123 comprises a circuit breaker 126, a relay device 128, one 16-amp output terminal 129A and four 10-amp output terminals 130A. The second power path 124 comprises a circuit breaker 131, a relay device 132, one 16-amp output terminal 129B and four 10-amp output terminals 130B. Similarly, the third power path 138 comprises a circuit breaker 141, a relay device 142, one 16-amp output terminal 129C and four 10-amp output terminals 130C.

An on/off switch assembly (not shown) controls the switching of relay devices 128, 132 and 142 in paths 123, 124 and 125, respectively, to control power to the output terminals 129A–C and 130A–C. Preferably, for implementations in North America, the power distribution apparatus 120 shown in FIG. 3A is a 60 amp, single phase, power distribution apparatus and provides 20 amps of current to output terminals 129A–C and 15 amps of current to output terminals 130A–C. The circuit breakers 126, 131 and 141 preferably are 20 amp, 2-pole circuit breakers. For international implementations of the power distribution apparatus 120, the input current rating will be 63 amps rather than 60 amps and the output currents provided to output terminals 129A–C will be 16 amps and the output current provided to output terminals 130A–C will be 10 amps.

Therefore, the power distribution apparatus 120 meets the UL 1950/CSA 950 North American regulatory requirements and the EN 60950/IEC 950 International regulatory requirements. However, it will be understood by those skilled in the art that the power distribution apparatus 120 shown in FIG. 3A is not limited to any particular input and output current ratings.

Figure 3B:
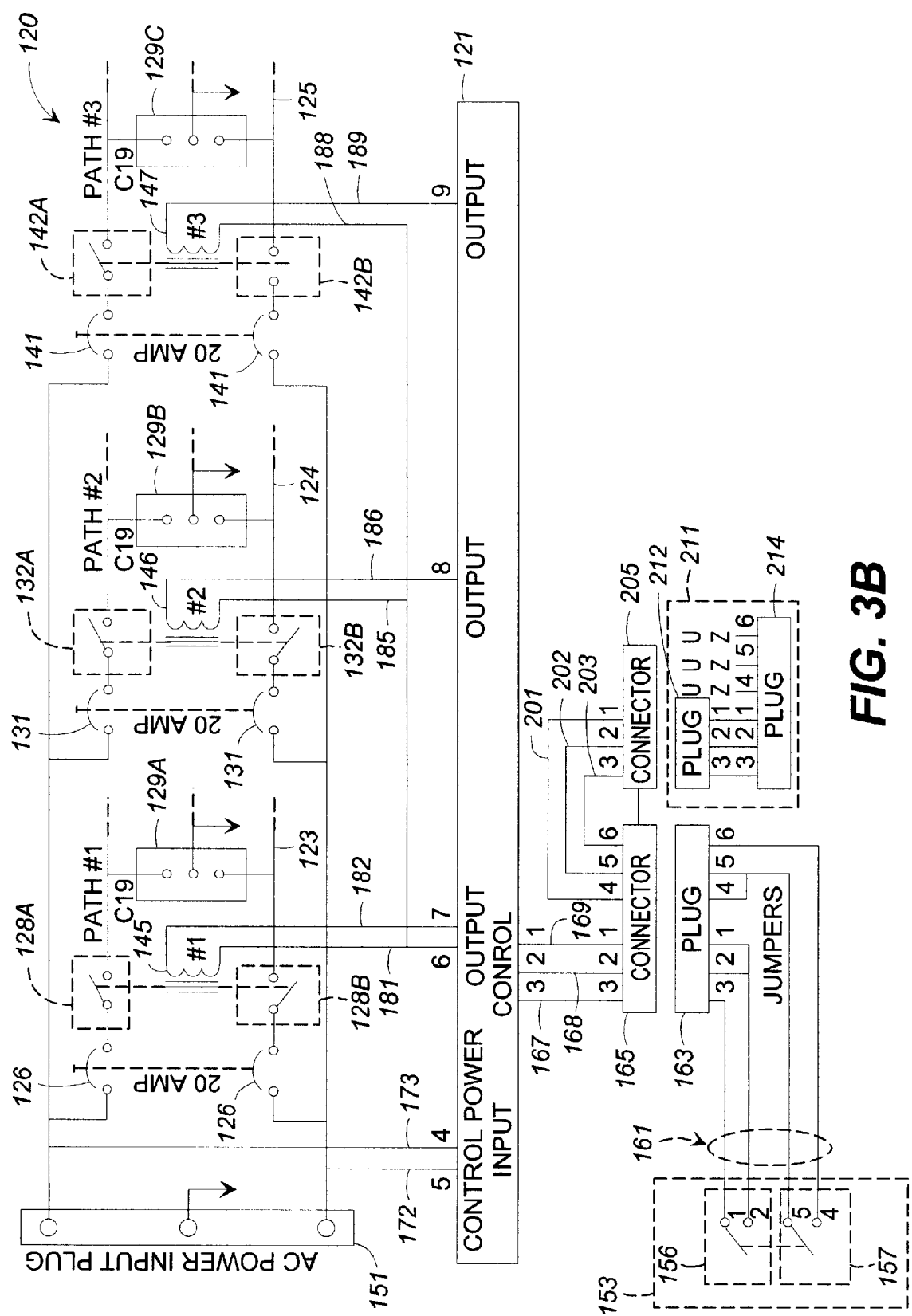
FIG. 3B is a schematic block diagram of the power distribution apparatus shown in FIG. 3A.

FIG. 3B is a schematic block diagram of the power distribution apparatus 120 shown in FIG. 3A. The power distribution apparatus 120 comprises a controller 121, which preferably is a printed circuit board, for controlling the relay devices 128, 132 and 142. The relay device 128 shown in FIG. 3A is designated by the dashed boxes 128A and 128B shown in FIG. 3B. The relay device 132 shown in FIG. 3A is designated by the dashed boxes 132A and 132B shown in FIG. 3B. The relay device 142 shown in FIG. 3A is designated by the dashed boxes 142A and 142B shown in FIG. 3B. The controller 121 controls the current provided to the inductors 145, 146 and 147 for opening and closing the relays 128A/128B, 132A/132B and 142A/142B, respectively. The controller 121 is substantially identical to the controller 40 shown in FIG. 2B and will be discussed in more detail below with respect to FIGS. 5A and 5B.

When the relays 128A/128B, 132A/132B and 142A/142B are closed, power is provided from the external power source (not shown) connected to the AC power input terminal 151 to the output terminals 129A–C connected to power paths 123, 124 and 125. For ease of illustration, only three of the ten output terminals 129A–C and 130A–C shown in FIG. 3A are shown in FIG. 3B. An on/off switch assembly 153 is electrically coupled to the controller 121 to allow the switching of the relays 128A/128B, 132A/132B and 142A/142B to be controlled from the on/off switch assembly 153. The on/off switch assembly 153 comprises two on/off switches 156 and 157 which control the operation of relays 128A/128B, 132A/132B, and 142A/142B via the controller 121. The relays are either all off or all on. However, when the relays are turned off or on, the are turned off or on in accordance with a predetermined timing sequence, which will be discussed below in detail.

The on/off switch assembly 153 may be mounted on the power distribution apparatus 120 directly and connected directly to the controller 121. Alternatively, the on/off switch assembly 153 may be remotely connected to the controller 121 via a cable to allow the operation of the relays 128A/128B, 132A/132B and 142A/142B to be controlled remotely. This latter arrangement is shown in FIG. 3B. FIG. 3B illustrates the on/off switch assembly 153 being coupled to a cable 161, which is connected to a plug 163, which, in turn, is coupled with a connector 165. The connector 165 is mounted on the power distribution apparatus 120 and provides the electrical connection between the on/off switch assembly 153 and the controller 121.

When on/off switches 156 and 157 of switch assembly 153 are activated, the controller 121 senses the activation through the lines 167, 168 and 169 which couple the connector 165 to the controller 121. The controller 121 receives the power input from the AC power input plug 151 via lines 172 and 173. The controller 121 then causes a current to be passed through inductor 145 via lines 181 and 182. The current passing through the inductor 145 generates a magnetic flux which causes the relay device 128A/128B to close, thereby allowing current to pass from the AC power input plug 151 to the output terminals 129 and 130 along power path 123.

When a predetermined length of time has passed after the closing of relay device 128A/128B, the controller 121 causes a current to be passed through inductor 146 via lines 185 and 186. The current passing through inductor 146 generates a magnetic flux which, in turn, causes the relay device 132A/132B to close, thereby allowing current to flow from AC power input plug 151 to output terminals 129 and 130 along power path 124.

When a predetermined length of time has passed after the closing of relay device 132A/132B, the controller 121 causes a current to be passed through inductor 147 via lines 188 and 189. The current passing through inductor 147 generates a magnetic flux which, in turn, causes the relay device 142A/142B to close, thereby allowing current to flow from AC power input plug 151 to output terminals 129 and 130 along power path 125.

The circuit breakers 126, 131 and 141 preferably are 20-amp, two-pole circuit breakers which prevent possible over-currents drawn by the electrical load from damaging the output power distribution wiring and power paths. It should be noted that the circuit breakers 126, 131 and 141 may be separate, independent circuit breakers or they may be combined into a single unit (not shown). Preferably, the circuit breakers are separate, independent circuit breakers so that one or more power paths may continue operation even when the circuit breakers in one or more other paths have cut off the flow of current to the output terminals along those paths.

In accordance with the preferred embodiment of the present invention, the connector 165 is connected by lines 201, 202 and 203 to a second connector 205 which is also comprised by the power distribution apparatus 120. This connector 205 can be used to enable a second power distribution apparatus identical to power distribution apparatus 120 to be connected to power distribution apparatus 120, or daisy chained, as discussed above with respect to FIG. 2B. A second power distribution apparatus (not shown) may be connected to power distribution apparatus 120 via plug assembly 211. Plug assembly 211 comprises a cable (not shown) having a plug 212 on one end thereof, which is plugged into connector 205, and having a plug 214 on the other end thereof, which is plugged into a connector which is identical to connector 165 on the second power distribution apparatus (not shown).

As discussed above, this feature of the present invention allows the second power distribution apparatus to be controlled by the on/off switch assembly 153 in the manner discussed above for controlling the operations of relays 128A/128B, 132A/132B and 142A/142B of the power distribution apparatus 120 shown in FIG. 3B. However, it will be understood by those skilled in the art that the connector 205 is not critical to the present invention and that it is not necessary to the operations of the power distribution apparatus 120.

Figure 4A:
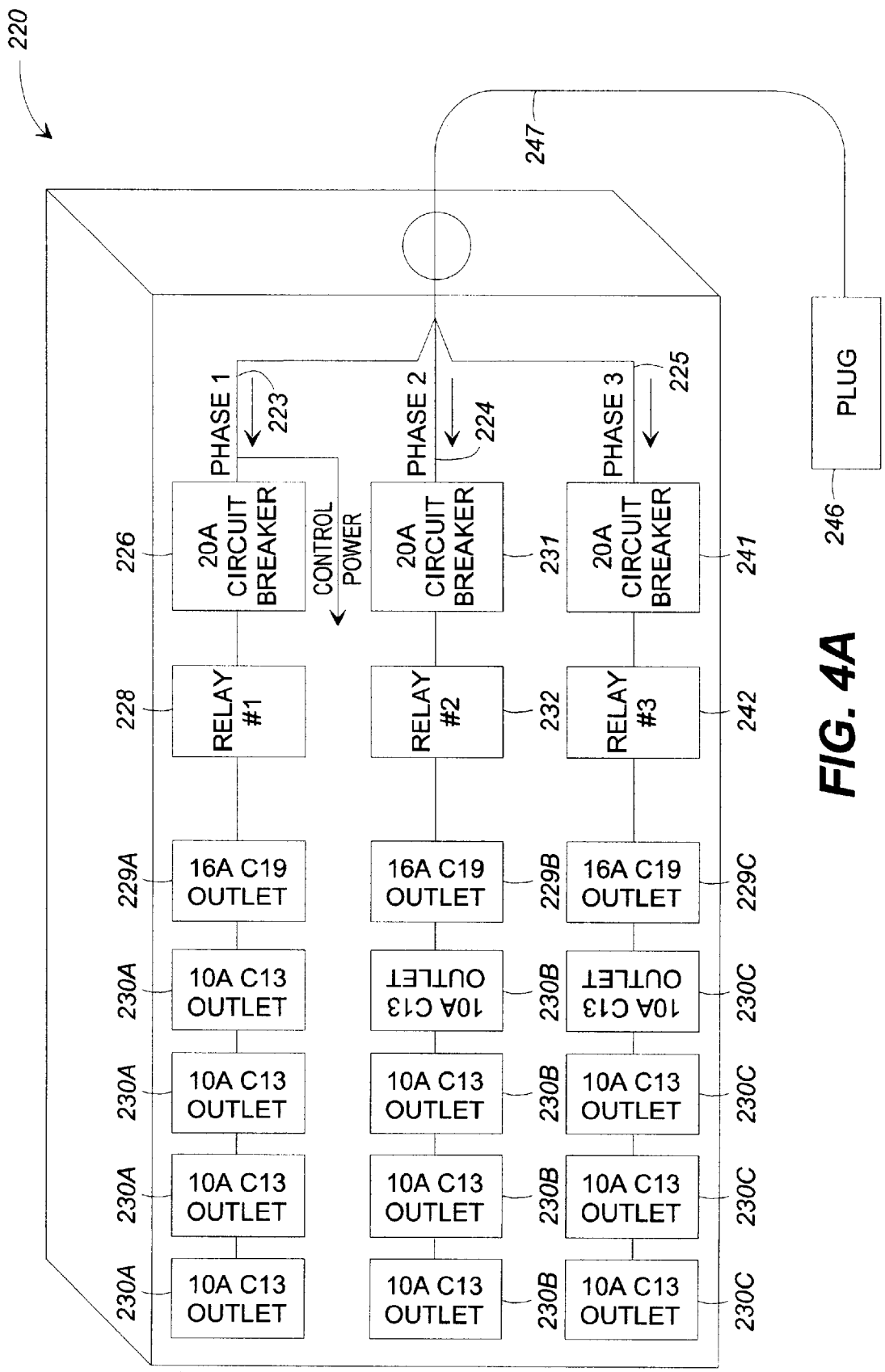
FIG. 4A is a perspective view of the power distribution apparatus of the present invention in accordance with a fourth embodiment, wherein the power distribution apparatus is a three-phase power distribution apparatus and comprises a power path associated with each phase, five output terminals associated with each power path, and a relay device associated with each power path.

FIG. 4A is a perspective view of the power distribution apparatus of the present invention in accordance with a fourth embodiment of the present invention. In accordance with this embodiment of the present invention, the power distribution apparatus 220 is a three-phase power distribution apparatus and comprises three power paths 223, 224 and 225. The power distribution apparatus 220 is connected to an AC power supply (not shown) via a five-wire plug 246 and a 200–240 volt AC cable 247. The first power path 223 comprises a circuit breaker 226, a relay device 228, one 16-amp output terminal 229A and four 10-amp output terminals 230A. The second power path 224 comprises a circuit breaker 231, a relay device 232, one 16-amp output terminal 229B and four 10-amp output terminals 230B. Similarly, the third power path 238 comprises a circuit breaker 241, a relay device 242, one 16-amp output terminal 229C and four 10-amp output terminals 230C.

An on/off switch assembly (not shown) controls the switching of relay devices 228, 232 and 242 in paths 223, 224 and 225, respectively, to control power to the output terminals 229A–C and 230A–C. Preferably, for implementations in North America, the "delta" power distribution apparatus 220 shown in FIG. 4A is a 60 amp, three-phase, power distribution apparatus and provides 20 amps of current to output terminals 229A–C and 15 amps of current to output terminals 230A–C. For international "Wye" power sources, the input plug is rated at 32 amps for three-phase operation. However, it will be understood by those skilled in the art that the present invention is not limited to these various implementation requirements because the present invention can be adapted to meet any implementation requirements. The manner in which the power distribution apparatuses of the present invention can be adapted to meet any implementation requirements.

It should be noted that the circuit breakers 226, 231 and 241 may be separate, independent circuit breakers or they may be combined into a single unit (not shown). Preferably, the circuit breakers are separate, independent circuit breakers so that one or more power paths may continue operation even when the circuit breakers in one or more other paths have cut off the flow of current to the output terminals along those paths.

Figure 4B:
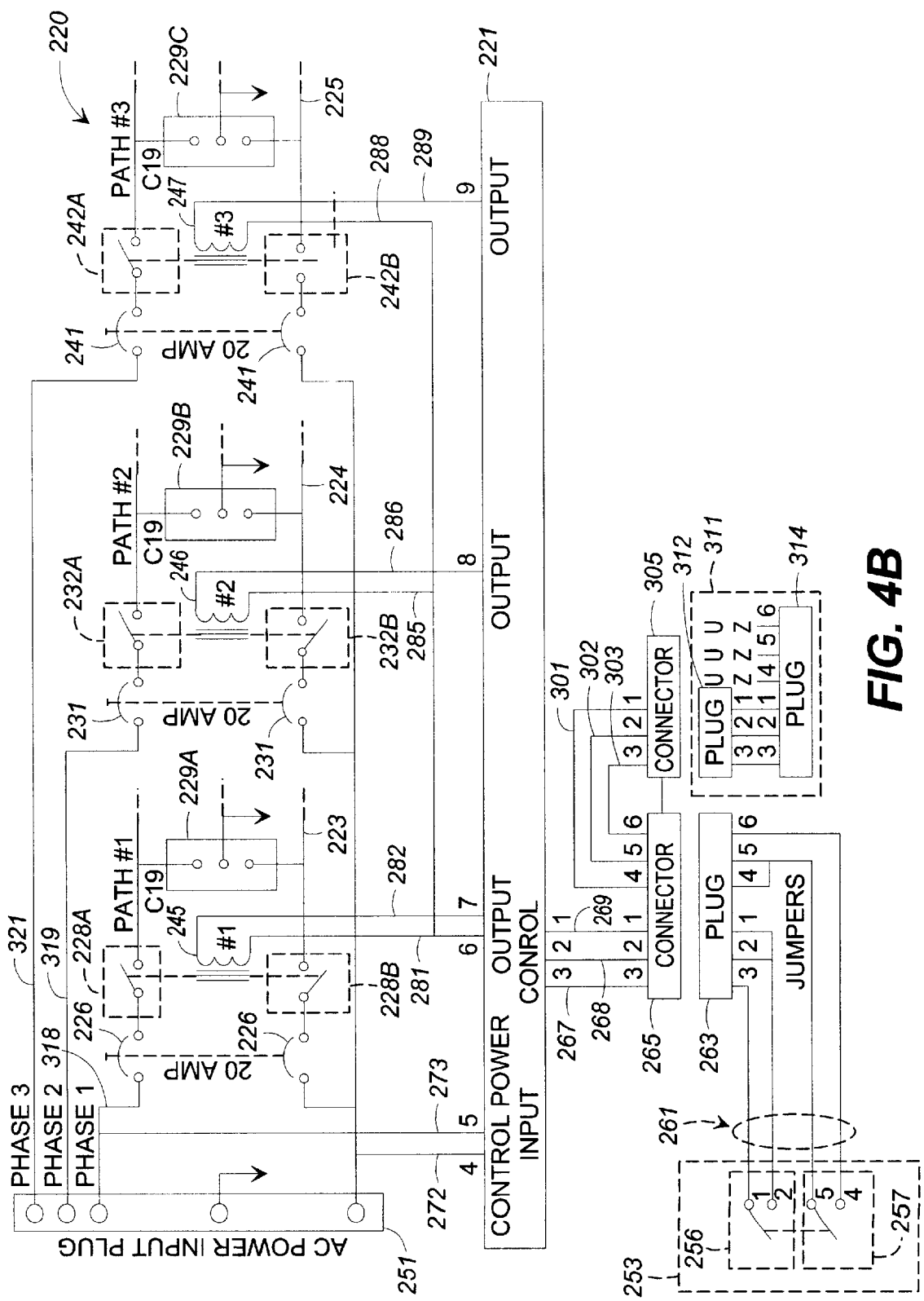
FIG. 4B is a schematic block diagram of the power distribution apparatus shown in FIG. 4A.

FIG. 4B is a schematic block diagram of the power distribution apparatus 220 shown in FIG. 4A. The power distribution apparatus 220 comprises a controller 221, which preferably is a printed circuit board, for controlling the relay devices 228, 232 and 242. The relay device 228 shown in FIG. 4A is designated by the dashed boxes 228A and 228B in FIG. 4B. The relay device 232 shown in FIG. 4A is designated by the dashed boxes 232A and 232B shown in FIG. 4B. The relay device 242 shown in FIG. 4A is designated by the dashed boxes 242A and 242B shown in FIG. 4B. The controller 221 controls the current provided to the inductors 245, 246 and 247 for opening and closing the relays 228A/228B, 232A/232B and 242A/242B, respectively. The controller 221 is substantially identical to the controllers 40 and 120 shown in FIGS. 2B and 3B.

When the relays 228A/228B, 232A/232B and 242A/242B are closed, power is provided from the external power source (not shown) connected to the AC power input terminal 251 to the output terminals 229A, 229B and 229C connected to power paths 223, 224 and 225, respectively. For ease of illustration, only three of the ten output terminals 229A–C and 230A–C shown in FIG. 4A are shown in FIG. 4B. An on/off switch assembly 253 is electrically coupled to the controller 221 to allow the switching of the relays 228A/228B, 232A/232B and 242A/242B to be controlled from the on/off switch assembly 253. The on/off switch assembly 253 comprises two on/off switches 256 and 257 which control the operation of relays 228A/228B, 232A/232B, and 242A/242B via the controller 221.

The on/off switch assembly 253 may be mounted on the power distribution apparatus 220 directly and connected directly to the controller 221. Alternatively, the on/off switch assembly 253 may be remotely connected to the controller 221 via a cable to allow the operation of the relays 228A/228B, 232A/232B and 242A/242B to be controlled remotely. FIG. 4B illustrates the on/off switch assembly 253 being coupled to a cable 261, which is connected to a plug 263, which, in turn, is coupled with a connector 265. The connector 265 is mounted on the power distribution apparatus 220 and provides the electrical connection between the on/off switch assembly 253 and the controller 221.

When on/off switches 256 and 257 are activated, the controller 221 senses the activation through the lines 267, 268 and 269 which couple the connector 265 to the controller 221. The controller 221 receives the power input from the AC power input plug 251 via lines 272 and 273 and phase I current is provided to the circuit comprising power path 223 via line 318. The controller 221 then causes a current to be passed through inductor 245 via lines 281 and 282. The current passing through the inductor 245 generates a magnetic flux which causes the relay device 228A/228B to close, thereby allowing current to pass from the AC power input plug 251 to the output terminals 229A and 230A along power path 223.

When a predetermined length of time has passed after the closing of relay device 129A, the controller 221 causes a current to be passed through inductor 246 via lines 285 and 286. The current passing through inductor 246 generates a magnetic flux which, in turn, causes the relay device 232A/232B to close, thereby allowing phase 2 current to flow from AC power input plug 251 to output terminals 229B and 230B along power path 224 via line 319.

When a predetermined length of time has passed after the closing of relay device 129B, the controller 221 causes a current to be passed through inductor 247 via lines 288 and 289. The current passing through inductor 247 generates a magnetic flux which, in turn, causes the relay device 242A/242B to close, thereby allowing phase 3 current to flow from AC power input plug 251 to output terminals 229C and 230C along power path 225 via line 321.

The circuit breakers 226, 231 and 241 preferably are 20-amp, two-pole circuit breakers which prevent over voltages emanating from the power source from affecting the electrical components (not shown) connected to the output terminals 229A–C and 230A–C.

In accordance with the preferred embodiment of the present invention, the connector 265 is connected by lines 301, 302 and 303 to a second connector 305 which is also comprised by the power distribution apparatus 220. This connector 305 can be used to enable a second power distribution apparatus identical to power distribution apparatus 220 to be connected together or daisy chained, as discussed above with respect to FIGS. 2B and 3B. A second power distribution apparatus (not shown) may be connected to power distribution apparatus 220 via plug assembly 311. Plug assembly 311 comprises a cable (not shown) having a plug 312 on one end thereof, which is plugged into connector 305, and having a plug 314 on the other end thereof, which is plugged into a connector which is identical to connector 265 on the second power distribution apparatus (not shown).

As discussed above, this feature of the present invention allows the second power distribution apparatus to be controlled by the on/off switch assembly 253 in the manner discussed above for controlling the operations of relays 228A/228B, 232A/232B and 242A/242B of the power distribution apparatus 220 shown in FIG. 4B. However, it will be understood by those skilled in the art that the connector 305 is not critical to the present invention and that it is not necessary to the operations of the power distribution apparatus 220.

Figure 5A:
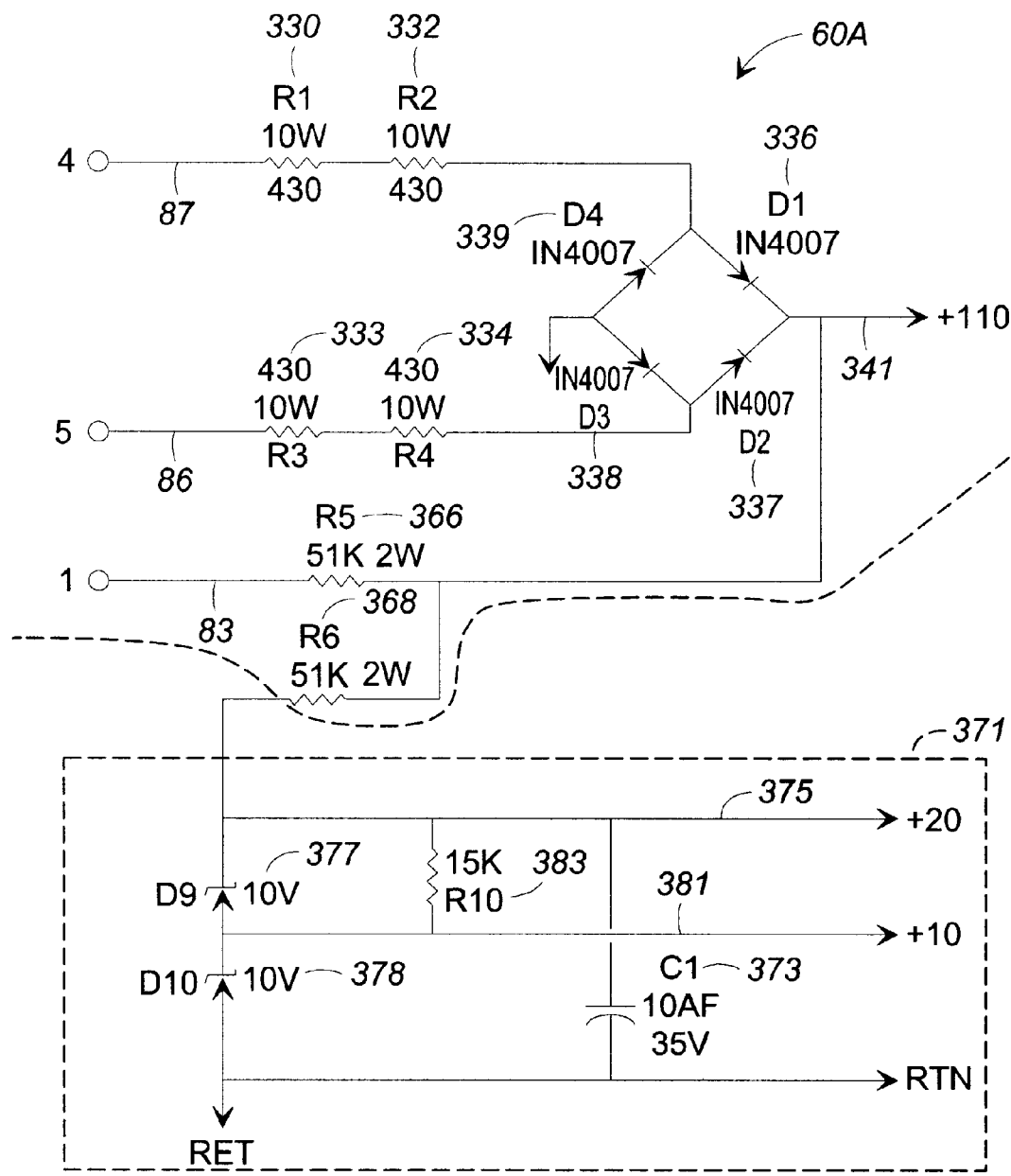
FIG. 5A illustrates a first portion of the controller comprised in the power distribution apparatuses shown in FIGS. 2A through 4B for controlling the operations of the power distribution apparatuses.
Figure 5B:
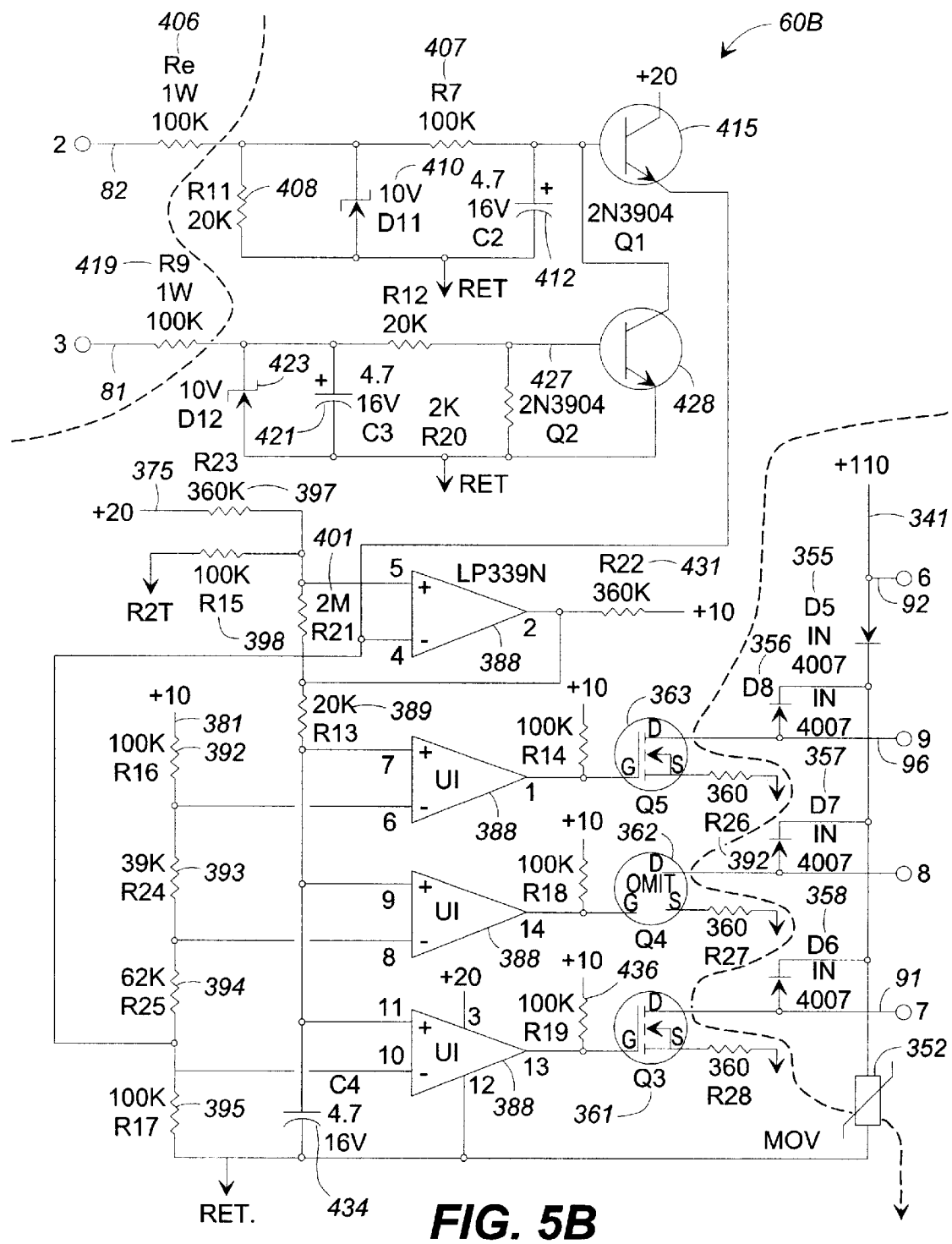
FIG. 5B illustrates a second portion of the controller comprised in the power distribution apparatuses shown in FIGS. 2A through 4B for controlling the operations of the power distribution apparatuses.

FIGS. 5A and 5B illustrate a schematic block diagram of the controller 60 of the power distribution unit 40 shown in FIG. 2B. The resistors 330, 332, 333 and 334 in the controller 60 provide an amount of series impedance required to drop the AC input voltage being provided to the controller via lines 86 and 87 from the AC power input terminal 65 to a level that is suitable for the coils of the relays 48A/48B and 49A/49B. If only two relay devices are used with the power distribution apparatus of the present invention, each of these resistors preferably is a 430 ohm resistor. If the power distribution apparatus comprises three relay devices, preferably the resistors 330–334 are 300 ohm resistors. In either of these cases, the total capability of the power distribution apparatus is approximately 40 watts, which is much greater than the amount of power required for normal operations. This 40-watt capability is advantageous in the event of a short circuit across the 110 volt DC bus 341 of the controller 60.

The rectifier circuit comprises diodes 336, 337, 338 and 339 rectifies the AC input voltage provided on lines 87 and 86 to the controller 60 in order to generate the 110 volt DC bus 341. When all of the relay devices are off, the voltage across the 110 volt DC bus rises to a level equal to the rectified input voltage. A voltage clamp 352 (FIG. 5B) is electrically coupled across the 110 volt DC bus 341 to limit the voltage to a level well below the voltage rating of the diodes 336 through 338 shown in FIG. 5A and 356 through 358 shown in FIG. 5B. The voltage clamp 352 preferably is a 510 volt metal oxide varistor which limits the voltage on the DC bus 341 to a level well below the 1,000 volt rating of the diodes, which preferably are 1N4007 diodes, and well below the 800 volt rating of the transistors 361, 362 and 363 show in FIG. 5B, which preferably are metal oxide semiconductor field effect transistors (MOS FETs).

The voltage clamp 352 provides protection against AC input over-voltage transients as well as inductive voltage spikes created when the relay devices are turned off. By clamping the coil voltages of the relay devices at a high value in this manner, the inductive current is quickly dissipated. This promotes a rapid relay armature release, which aids in breaking partially welded relay contacts, thereby increasing the life of the relay devices.

It should be noted that the interface to the controller of the present invention (e.g., lines 267, 268 and 269 and connector 265 in FIG. 4B) enables the power distribution apparatus of the present invention to operate with or without the on/off switch assembly 253 such that the on/off switch assembly can be unplugged from the power distribution apparatus with no effect on the operation of the power distribution apparatus. This is because the input pins of the controller connected to lines 82 and 83 in FIG. 2B, to lines 167 and 168 in FIG. 3B, and to lines 267 and 268 in FIG. 4B, are open circuited when the on/off switch assembly is unplugged from the power distribution unit. The two-transistor interface comprised of transistors 415 and 428 in FIG. 5B has no affect on operations of the power distribution apparatus when this occurs.

Resistor 366 shown in FIG. 5A and resistors 406 and 419 shown in FIG. 5B provide an impedance limited current from the 110 volt DC bus 341 in order to enable the on/off switch assembly 67 to operate. These resistors also provide an impedance protection network which provides impedance protection on the high-voltage control interface against cable and/or switch wiring shorts to earth ground. Resistor 368 placed along the 110 volt DC bus 341 preferably causes approximately 2 milliamps of current to be provided to the voltage supply portion 371 of the controller 60. The capacitor 373 filters the ripple on the 20 volt supply 375 and provides power "hold over time" after an AC input power loss. The series combination of the zener diodes 377 and 378 regulates the supply voltage 375 to 20 volts. The zener diode 378 provides the 10 volt voltage reference supply 381. Current through resistor 383 maintains the zener diode 378 at 10 volts, even when the 20 volt supply is below 20 volts, such as during power-up or after an input power loss.

An under-voltage lockout section of comparators 388 shown in FIG. 5B, which preferably are open-collector types, prevents operation when the AC input voltage is too low. During these "under voltage" conditions, the output (pin 2 connected to lines 82, 168 and 268 in FIGS. 2B, 3B and 4B, respectively) of this section of the controller 60 is pulled low. The comparator section comprised of comparators 388 compares the 20 volt supply 375 to the 10 volt reference 381. The 10 volt reference is reduced to 3.3 volts by a resistor divider circuit comprising resistors 392, 393, 394 and 395. The 20 volt supply 375 is reduced by a resistor divider comprising resistors 397 and 398. The outputs of the comparators 388 go high when the voltage supply 375 goes above 17 volts. The outputs of the comparators 388 go low when the supply voltage 375 drops below 15 volts. The 2 volt hysterysis is provided by the resistor 401.

In accordance with the preferred embodiment of the present invention, the relay devices of the power distribution apparatuses shown in FIGS. 2B, 3B and 4B are turned on by the controller 60, 121 and 221, respectively. Thus, if all of the relays in the power distribution apparatus 40 are switched on by an operator at on/off switch assembly 67 simultaneously, the relay devices 48A/48B and 49A/49B will not be turned on simultaneously by the controller 60, but rather, will be turned on in accordance with a predetermined sequence. For example, relay device 48A/48B may be turned on first and then a predetermined time delay (e.g., one second) will elapse before the controller 60 turns on the relay device 49A/49B.

By sequencing the activation of the relay devices, input current surges on the power distribution apparatus 40 are prevented. Similarly, if an operator operating on/off switch assembly 67 turns both of the relay devices 48A/48B and 49A/49B off simultaneously, the controller 60 will cause a predetermined time delay to elapse after turning off one of the relay devices before turning off the other relay device (e.g., 20 milliseconds). The time delay in either of these cases is not critical. By turning off the relay devices in sequence in this manner, voltage transients in the input power sources are prevented from occurring.

If a momentary AC input outage occurs, switching power supplies, which are typical components in the output load, may be able to supply power for a short time (e.g., approximately 50 milliseconds at 50% load). Therefore, the controller 60 should not reset the relay start-up sequence for outages of less than 50 milliseconds. Therefore, the relay devices in the power distribution unit 60 are held in their on states to allow the output load to recover from momentary outages when the power returns. Alternatively, for longer AC input outages, the relay start-up sequence is reset to reduce AC input current surge.

During operation, current from the 110 volt DC bus flows through resistors 366 and 368 shown in FIG. 5A and through resistors 406 and 407 shown in FIG. 5B. The voltage cross resistor 408 is clamped to 10 volts by zener diode 410. The 10 volt signal is applied to an RC timing network comprised of resistor 407 and capacitor 412. This timing network causes the voltage on capacitor 412 to reach approximately 5 volts after approximately 0.5 seconds. The emitter follower 415 applies this 5 volt signal to the undervoltage lockout comparators 388, thus causing all of the relay devices to be turned off via the signals provided on lines 91, 92 and 96 to the inductors 61 and 62.

When the on/off switch assembly 67 is in the on position, an additional current path from the 110 volt DC bus 341 allows current flow through resistors 366 in FIG. 5A and resistor 419 in FIG. 5B. The capacitor 421 is quickly charged to 10 volts and is clamped by the zener diode 423. When the voltage on the base 427 of transistor 428 reaches approximately 5 volts, transistor 428 turns on and discharges capacitor 421. With capacitor 421 discharged, the undervoltage lockout comparators 388 will not prevent the normal start-up sequence. In accordance with the normal start-up sequence, the relays sequence on at 1 second intervals after AC input power is applied. It should also be noted that the capacitors 412 and 421 provide a high AC noise immunity which protects against control malfunctions.

When the output of comparator 389 coupled to resistor 431 goes high, the resistor 431 charges a timing capacitor 434. The voltage ramp across capacitor 434 provides the relay device turn-on sequence. When the voltage across capacitor 434 reaches 3.3 volts, a pullup resistor 436 turns transistor 361 on. In turn, transistor 361 turns on relay device 48A/48B, which is connected to line 91, as shown in FIG. 2B. Similarly, when the voltage on the capacitor 434 reaches 6.7 volts, the transistor 363 is turned on, which turns on relay device 49A/49B. If a third relay device is comprised by the power distribution apparatus of the present invention, such as in the embodiments shown in FIGS. 3B and 4B, the transistor 362, which has been omitted from FIG. 5B, would be present and would turn on the third relay device when the voltage on the capacitor 434 reaches 5.4 volts.

The relay device turn-off sequence occurs as follows. When the output of the comparator 388 (pin 2 connected to line 268 in FIG. 4B) coupled to resistor 431 goes low, capacitor 434 is discharged through resistor 389. The voltage discharge ramp on capacitor 434 allows approximately 20 milliseconds of separation in time between the turn off of each relay device. As discussed above, this prevents sudden removal on the AC input source and minimizes the generation of transient over-voltages.

Transistors 361–363 have resistors connected to their leads to their sources which enable the transistors to operate as regulated (i.e., limiting) current sources. The resistor values are chosen to limit the current through the coils of the relay devices. Limiting occurs at the peak of the AC input sine wave. A greater part of the AC sine wave is current limited (i.e., flat topped) when the input voltage is greater than the AC sine wave. This limiting results in less variation of relay coil current and permits a wider AC input voltage operating range. In addition, by operating the coil closer to nominal current reduces contact bounce in the relay devices and improves contact life.

One of the advantages of placing relatively large resistors 330–334 (preferably 430 ohms, 10 watts) before the voltage clamp 352 is that it increases the impedance that the voltage clamp 352 must operate into and enables the voltage to be clamped to a reasonable level (e.g., 500 volts). Also, these resistors 330–334 drop the voltage down to a level which is proper for operation of typical DC relay devices, which generally have better performance characteristics than AC relay devices and which typically require less than 120 volts dc. Since the resistors 330–334 are relatively large, they also function to clamp the voltage on the diode rectifier bridge comprised of diodes 336–339 and thus provide impedance protection to the controller.

It will be understood by those skilled in the art that the present invention has been described with respect to the preferred embodiments but that the present invention is not limited to these embodiments. For example, although power distribution apparatuses have been described having two and three relay devices, it will be understood by those skilled in the art that the present invention is not limited to any particular number of relay devices in the power distribution apparatuses. It will also be understood by those skilled in the art that the present invention is not limited with respect to the component values used in the various portions of the power distribution apparatus of the present invention, including in the controller.

Also, the present invention is not limited to any particular timing intervals between relay device turn-on and turn-off sequencing, as will be understood by those skilled in the art. Furthermore, it is not necessary that this timing sequence be implemented in every instance of the power distribution apparatus of the present invention, as will be understood by those skilled in the art. This feature of the present invention is very advantageous for obvious reasons, but those skilled in the art will understand that it is not critical to the fundamental operations of the power distribution apparatus of the present invention. Those skilled in the art will understand that other modifications may be made to the embodiments discussed above which are within the scope of the present invention.

What is claimed is:

1. A power distribution apparatus comprising:
   an input terminal for coupling a power source to the power distribution apparatus;
   a plurality of output terminals for coupling electrical devices to the power distribution apparatus, each output terminal having a power path associated therewith, wherein the power distribution apparatus comprises at least a first power path and a second power path, the first power path electrically coupling the input terminal to at least one output terminal electrically coupled to the first power path, the second power path electrically coupling the input terminal to at least one output terminal electrically coupled to the second power path;
   a first relay device disposed along the first power path at a location between the input terminal and said at least one output terminal electrically coupled to the first power path, wherein the first relay device controls current flow along the first power path from the input terminal to said at least one output terminal electrically coupled to the first power path to thereby control the flow of current from the input terminal to said at least one output terminal electrically coupled to the first power path;
   a second relay device disposed along the second power path at a location between the input terminal and said at least one output terminal electrically coupled to the second power path, wherein the second relay device controls current flow along the second power path from the input terminal to said at least one output terminal electrically coupled to the second power path to thereby control the flow of current from the input terminal to said at least one output terminal electrically coupled to the second power path; and
   a controller in communication with the first and second relay devices, the controller receiving input from a switching assembly, the controller interpreting the input from the switching assembly to determine whether the first and second relay device are to be switched on or off, wherein if the controller determines that the first and second relay devices are to be switched on, the controller causes the first and second relay devices to be switched on in sequence, wherein the first relay device is turned on by the controller first in the sequence, and wherein a delay period of a predetermined length of time elapses after the first relay device is switched on before the second relay device is switched on by the controller.

2. The power distribution apparatus of claim 1, wherein the first and second relay devices are remotely controlled by the switching assembly, the switching assembly being in communication with the controller of the power distribution apparatus.

3. The power distribution apparatus of claim 2, wherein the first and second power paths are electrically isolated from one another.

4. The power distribution apparatus of claim 3, further comprising a first circuit breaker disposed in the first power path between the input terminal and the first relay device and a second circuit breaker disposed in the second power path between the input terminal and the second relay device.

5. The power distribution apparatus of claim 3, further comprising:
a coupling assembly which enables said power distribution apparatus to be coupled to a second power distribution apparatus and which allows the second power distribution apparatus to be controlled by said switch assembly.

6. The power distribution apparatus of claim 3, wherein the switching assembly can be disconnected from the controller without affecting operation of the power distribution apparatus.

7. The power distribution apparatus of claim 3, wherein the input terminal is electrically coupled to the controller, and wherein the controller comprises input circuitry having a high impedance, wherein the high impedance of the input circuitry protects the controller from over voltage transients occurring at the input terminal of the power distribution apparatus.

8. The power distribution apparatus of claim 3, wherein the input terminal is electrically coupled to the controller at a controller interface comprised by the controller, and wherein the controller interface comprises input circuitry having a high impedance, wherein the high impedance of the input circuitry protects the controller from over voltage transients occurring at the input terminal of the power distribution apparatus.

9. The power distribution apparatus of claim 8, wherein the input circuitry generates a relatively low current which is utilized by the controller to switch the relay devices off and on.

10. The power distribution apparatus of claim 2, further comprising:
a third power path having a plurality of output terminals electrically coupled thereto for coupling electrical devices to the power distribution apparatus, the third power path providing a current path from the input terminal to the output terminals electrically coupled to the third power path; and
a third relay device disposed along the third power path at a location between the input terminal and said at least one output terminal electrically coupled to the third power path, wherein the third relay device controls current flow along the third power path from the input terminal to said at least one output terminal electrically coupled to the third power path to thereby control the flow of current from the input terminal to said at least one output terminal electrically coupled to the third power path.

11. The power distribution apparatus of claim 10, wherein the switching assembly controls the switching on and off of the third relay device to thereby control the flow of current from the input terminal to the output terminals electrically coupled to the third power path, the third relay device being in communication with the controller, the controller interpreting the input from the switching assembly to determine whether the third relay device is to be switched on or off, wherein when the controller determines that the first, second and third relay devices are to be switched off, the controller switches the first, second and third relay devices off, and wherein when the controller determines that the first, second and third relay devices are to be switched on, the controller switches the first, second and third relay devices on, thereby allowing current to flow from the input terminal along the first, second and third power paths to the output terminals electrically coupled to the first, second and third power paths.

12. The power distribution apparatus of claim 11, wherein if the controller determines that the first, second and third relay devices are to be switched on, the controller causes the first, second and third relay devices to be switched on in sequence, wherein the first relay device is turned on by the controller first in the sequence, and wherein a delay period of a predetermined length of time elapses after the first relay device is switched on before the second relay device is switched on by the controller, and wherein a delay period of a predetermined length of time elapses after the second relay device is switched on before the third relay device is switched on by the controller.

13. The power distribution apparatus of claim 12, wherein the power distribution apparatus is a three-phase power distribution apparatus and wherein the first, second and third power paths are 120 degrees out of phase from one another.

14. The power distribution apparatus of claim 12, further comprising a coupling assembly, wherein the coupling assembly enables the power distribution apparatus to be electrically coupled to a second power distribution apparatus and which allows the second power distribution apparatus to be controlled by said switch assembly.

15. The power distribution apparatus of claim 12, wherein the switching assembly can be disconnected from the controller without affecting operation of the power distribution apparatus.

16. The power distribution apparatus of claim 12, wherein the input terminal is electrically coupled to the controller at a controller interface comprised by the controller, and wherein the controller interface comprises input circuitry having a high impedance, wherein the high impedance of the input circuitry protects the controller from over voltage transients occurring at the input terminal of the power distribution apparatus.

17. The power distribution apparatus of claim 12, wherein the input circuitry generates a relatively low current which is utilized by the controller to switch the relay devices off and on.

18. The power distribution apparatus of claim 12, wherein the controller comprises a high-voltage control interface, the switching assembly being coupled to the controller at the high-voltage control interface, the high-voltage control interface comprising an impendace limiting network which protects the switching assembly against short circuits which may occur in the controller.

* * * * *